United States Patent
Sharma et al.

(10) Patent No.: US 11,722,310 B2
(45) Date of Patent: Aug. 8, 2023

(54) AUTOMATICALLY DISCOVERING AND SECURELY IDENTIFYING CONNECTED SYSTEMS

(71) Applicant: EMC IP Holding Company LLC, Hopkinton, MA (US)

(72) Inventors: Anurag Sharma, Cedar Park, TX (US); Maunish A. Shah, Austin, TX (US); Senthil Ponnuswamy, San Jose, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 256 days.

(21) Appl. No.: 17/149,238

(22) Filed: Jan. 14, 2021

(65) Prior Publication Data
US 2022/0224542 A1 Jul. 14, 2022

(51) Int. Cl.
*H04L 29/06* (2006.01)
*H04L 9/32* (2006.01)
*H04L 9/40* (2022.01)
*H04L 61/4511* (2022.01)

(52) U.S. Cl.
CPC ........ *H04L 9/3242* (2013.01); *H04L 61/4511* (2022.05); *H04L 63/04* (2013.01)

(58) Field of Classification Search
None
See application file for complete search history.

(56) References Cited

U.S. PATENT DOCUMENTS

| | | | |
|---|---|---|---|
| 8,706,914 B2 | 4/2014 | Dechesneau | |
| 8,706,915 B2 | 4/2014 | Dechesneau | |
| 10,305,758 B1 | 5/2019 | Bhide | |
| 10,791,152 B2 | 9/2020 | Harrison | |
| 10,892,950 B2 | 1/2021 | Sherman | |
| 11,329,830 B1* | 5/2022 | Resch | H04L 63/10 |
| 2002/0178360 A1* | 11/2002 | Wenocur | H04L 63/12 |
| | | | 713/170 |
| 2002/0199001 A1* | 12/2002 | Wenocur | H04L 69/329 |
| | | | 709/227 |

(Continued)

OTHER PUBLICATIONS

Lin, Ping; Lin, Lin. ecurity in enterprise networking: A quick tour. IEEE Communications Magazine, vol. 34, Issue: 1. https://ieeexplore.ieee.org/stamp/stamp.jsp?tp=&arnumber=482247 (Year: 1996).*

(Continued)

*Primary Examiner* — Jeremiah L Avery
(74) *Attorney, Agent, or Firm* — Ryan, Mason & Lewis, LLP

(57) ABSTRACT

Methods, apparatus, and processor-readable storage media for automatically discovering and securely identifying connected systems are provided herein. An example computer-implemented method includes discovering a set of one or more systems connected via at least one network using one or more domain name server (DNS) service discovery techniques; identifying at least one of the one or more systems of the discovered set by processing cryptographic data associated with at least a portion of the one or more systems using one or more digest access authentication techniques; and performing one or more automated actions based at least in part on the at least one identified system.

20 Claims, 13 Drawing Sheets

(56) References Cited

U.S. PATENT DOCUMENTS

| | | | |
|---|---|---|---|
| 2002/0199096 A1* | 12/2002 | Wenocur | H04L 51/00 |
| | | | 713/153 |
| 2005/0138428 A1 | 6/2005 | McAllen et al. | |
| 2009/0216910 A1 | 8/2009 | Duchesneau | |
| 2013/0306276 A1 | 11/2013 | Duchesneau | |
| 2014/0317315 A1 | 10/2014 | Duchesneau | |
| 2015/0207625 A1 | 7/2015 | Sathaye | |
| 2016/0248631 A1 | 8/2016 | Duchesneau | |
| 2016/0337181 A1 | 11/2016 | Cathrow et al. | |
| 2018/0041496 A1 | 2/2018 | Shivanna et al. | |
| 2019/0044823 A1 | 2/2019 | Soundararajan | |
| 2020/0104401 A1 | 4/2020 | Burnett | |
| 2020/0104402 A1 | 4/2020 | Burnett | |
| 2020/0204527 A1* | 6/2020 | Vass | G06Q 10/107 |
| 2020/0228779 A1 | 7/2020 | Kendrick | |
| 2020/0344084 A1* | 10/2020 | Shribman | H04L 67/1021 |
| 2020/0358858 A1* | 11/2020 | Shribman | H04L 67/563 |
| 2021/0117749 A1 | 4/2021 | Vetter | |
| 2022/0366001 A1* | 11/2022 | Shribman | H04L 67/568 |

OTHER PUBLICATIONS

Subramanian, Sureshkumar V.; Dutta, Rudra. Comparative Study of Secure vs. Non-secure Transport Protocols on the SIP Proxy Server Performance: An Experimental Approach. 2010 International Conference on Advances in Recent Technologies in Communication and Computing. (Link provided below on line W) (Year: 2010).*

Link to above NPL on line V: https://ieeexplore.ieee.org/stamp/stamp.jsp?tp=&arnumber=5656775 (Year: 2010).*

* cited by examiner

```
; 1. Domain Enumeration
;
; These records invite clients to browse this domain.
; (The '@' sign means "the current domain" --
; i.e. the domain being described by this zone file.)

b._dns-sd._udp  IN PTR @  ; b = browse domain
lb._dns-sd._udp IN PTR @  ; lb = legacy browse domain
; (domain that will be used for clients that don't specify a domain to browse)

; 2. List of named service entities
;
; These records list the named 'http' service entities we want clients
; to be able to discover.

_http._tcp PTR SDS\ System._http._tcp

; 3. SRV & TXT records describing each service entity named above
;
; These records tell clients how to access the named 'http' service
; entities listed above.

;_service._proto.name.   TTL   class SRV  priority weight port target.
SDS\ System._http._tcp         SRV 0 0 443 sds.domain1.com.
SDS\ System._http._tcp         SRV 0 0 443 sds.domain2.com.
SDS\ System._http._tcp         SRV 0 0 443 sds.domain3.com.
```

FIG. 2

```
GET / index.html HTTP/1.0
Host: 111.111.11.11
X-Org-SystemID: yyyy5efc06dayyyy
Authorization: Digest username="username entered by admin",
    realm="SDS service domain name",
    nonce="zzzzyx38c7kxpq7yzzzz",
    uri="/index.html",
    qop=auth,
    nc=00000001,
    cnonce="vvlziovv",
    response="qqqtbreapjk6mea3cqqq",
    opaque="target opaque string"
```

AUTOMATICALLY DISCOVERING AND SECURELY IDENTIFYING CONNECTED SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for providing security in such systems.

BACKGROUND

In many instances and contexts, systems seek to interact with other connected systems within one or more networks. However, operations-related and security-related challenges exist in carrying out such interactions. For example, conventional system security techniques, in attempting to discover secure connected target systems, typically require that a system administrator know and enter the internet protocol (IP) addresses of all target systems. In such conventional techniques, the process of manually entering IP addresses is time-consuming and error-prone, and also does not provide confirmation that the target systems are operational.

SUMMARY

Illustrative embodiments of the disclosure provide techniques for automatically discovering and securely identifying connected systems. An exemplary computer-implemented method includes discovering a set of one or more systems connected via at least one network using one or more domain name server (DNS) service discovery techniques, identifying at least one of the one or more systems of the discovered set by processing cryptographic data associated with at least a portion of the one or more systems using one or more digest access authentication techniques, and performing one or more automated actions based at least in part on the at least one identified system.

Illustrative embodiments can provide significant advantages relative to conventional system security techniques. For example, problems associated with time-consuming and error-prone processes involving manually entering IP addresses are overcome in one or more embodiments through discovering systems connected via at least one network using DNS service discovery ("DNS-SD") techniques and identifying at least a subset of the discovered systems using digest access authentication techniques.

These and other illustrative embodiments described herein include, without limitation, methods, apparatus, systems, and computer program products comprising processor-readable storage media.

BRIEF DESCRIPTION OF THE DRAWINGS

FIG. 2 shows an example zone file in an illustrative embodiment.

FIG. 6 shows an example source system cluster manager response in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
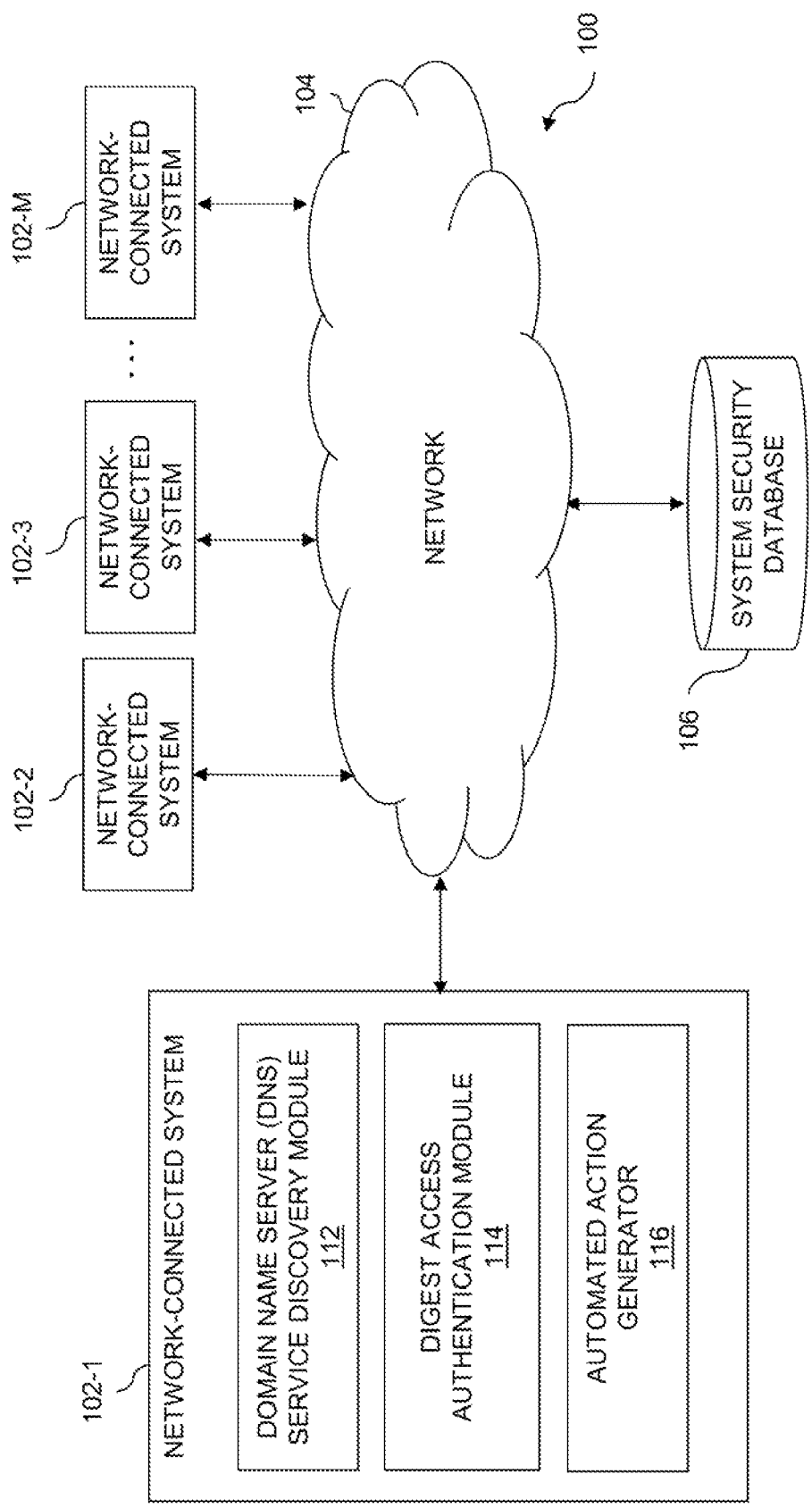
FIG. 1 shows an information processing system configured for automatically discovering and securely identifying connected systems in an illustrative embodiment.

FIG. 1 shows a computer network (also referred to herein as an information processing system) 100 configured in accordance with an illustrative embodiment. The computer network 100 comprises a plurality of network-connected systems 102-1, 102-2, 102-3, . . . 102-M, collectively referred to herein as systems 102. The systems 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

The systems 102 may comprise, for example, servers, cell towers and/or other types of edge servers, mobile telephones, laptop computers, tablet computers, desktop computers or other types of computing devices. Such devices are examples of what are more generally referred to herein as "processing devices." Some of these processing devices are also generally referred to herein as "computers."

The systems 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, one or more of the systems 102 can have an associated database 106 configured to store data pertaining to connecting with other systems within the network, which comprise, for example, authentication data or other types of security-related data including passwords and other information associated with secure system connections.

The database 106 in the present embodiment is implemented using one or more storage systems associated with systems 102. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the systems 102 can be one or more input-output devices, which illustratively comprise keyboards, displays or other types of input-output devices in any combination. Such input-output devices can be used, for example, to support one or more user interfaces to systems 102, as well as to support communication between systems 102 and other related systems and devices not explicitly shown.

Each system 102 in the FIG. 1 embodiment is assumed to be implemented using at least one processing device. Each such processing device generally comprises at least one processor and an associated memory, and implements one or more functional modules for controlling certain features of the systems 102.

More particularly, systems 102 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSIDs), and should therefore not be viewed as limited in any way to spinning magnetic media.

The network interface allows the systems to communicate over the network 104 with other systems 102, and illustratively comprises one or more conventional transceivers.

As also illustrated in FIG. 1, one or more of systems 102 in the FIG. 1 embodiment further comprises a DNS-SD module 112, a digest access authentication module 114, and an automated action generator 116. It is to be appreciated that this particular arrangement of modules 112, 114 and 116 illustrated in systems 102 of the FIG. 1 embodiment is presented by way of example only, and alternative arrangements can be used in other embodiments. For example, the functionality associated with the modules 112, 114 and 116 in other embodiments can be combined into a single module, or separated across a larger number of modules. For instance, in one or more embodiments, a network-connected and/or engineered system (e.g., one of systems 102) constitutes a cluster of servers spread across multiple racks in a data center, and in such an embodiment, only one of these servers hosting management functions needs to have DNS-SD and digest access authentication functionalities and be connected to at least one data center-specific DNS server for publishing its discovery information. Other servers, in such an embodiment, need not be aware of connectivity to an external network and can stay behind a firewall and/or a non-mutable network for security reasons. As another example, multiple distinct processors can be used to implement different ones of the modules 112, 114 and 116 or portions thereof. The term "DNS server," as used herein, is intended to be broadly construed, so as to encompass, for example, at least one server component of a Domain Name System, also commonly known by the acronym DNS.

At least portions of modules 112, 114 and 116 may be implemented at least in part in the form of software that is stored in memory and executed by a processor.

It is to be understood that the particular set of elements shown in FIG. 1 for automatically discovering and securely identifying connected systems involving systems 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of at least one system 102 and system security database 106 can be on and/or part of the same processing platform.

An exemplary process utilizing modules 112, 114 and 116 of an example system 102 in computer network 100 will be described in more detail with reference to the flow diagram of FIG. 11.

Accordingly, at least one embodiment includes automated discovery and secure identification of available remote sites and/or systems connected via one or more networks. As detailed herein, such an embodiment includes automatically discovering and/or detecting all connected systems using DNS-SD techniques as well as utilizing one or more uniform resource locators (URLs) to output and/or display information about one or more of the connected (target) systems (e.g., to an administrator or other user). Also, such an embodiment includes securely identifying and/or securely confirming the identity of one or more of the connected (target) systems. Additionally or alternatively, automatic responses from the target system(s) can be generated and output to the source system(s) confirming that the target system(s) is/are operational.

As further detailed herein, one or more embodiments include implementing a discovery and handshake solution which connects two or more systems in many domains or contexts. For example, two data protection systems can connect for backup and/or restore operations in addition to synchronous (sync) and/or asynchronous (async) replications and/or multi-way replication from a single system. It is to be appreciated that while one or more embodiments described herein illustratively detail a replication use case, one or more additional embodiments can be carried out in connection with discovery and secure identification of any set of remote software services connected via a network, independent of hardware infrastructure and without requiring a central authentication service.

As also described herein, an engineered solution can be delivered to users, for example, as an integrated rack, an appliance, and/or a bring-your-own (BYO) hardware consumption model for on-premise deployment. Additionally, there are many deployment models wherein an engineered solution is deployed to multiple racks, fault-sets (i.e., a logical grouping of racks), availability zones, data centers, edges, geo-locations, etc. for purposes of disaster recovery, data locality imposed by regional and/or geographic compliance rules, improving latency, etc. In such a deployment model, there can be multiple use cases wherein one system needs to communicate to a set of other systems for the purpose of sync/async replication, cloning, backup and/or recovery, etc. Such cross-instance, cross-site, and/or cross-system communication may form a direct (i.e., one-to-one) topology, a fan-in (i.e., many-to-one) topology, or a fan-out (i.e., one-to-many) topology.

Before a fan-in and/or fan-out topology of network communication can be established across systems, such systems need to establish trust with each other, which can require a solution-specific pairing configuration. The pairing of two systems, for example, in replication use cases, can require steps that must be carried out at one or both systems. By way of illustration, such steps might include exporting the metadata management server (MDM) certificate of the source system and importing the same into the target system to establish mutual transport layer security (mTLS) authentication, registering a peer replication system IP address, creating a new replication consistency group (RCG) with a specific recovery point objective (RPO) across two protection domains, and adding a pair of volumes in the RCG to enable replication.

Accordingly, a challenge can exist in determining how to automatically discover systems connected via a network, identify them securely from a source system (which can be any of the connected systems), and allow an administrator of the source system to configure fan-in or fan-out topology without visiting the target system(s). As such, one or more embodiments include automatically discovering cluster manager services across multiple systems connected via one or more network links (e.g., LAN and/or WAN links), and enabling a system administrator of any cluster manager to view the inventory of discovered peer systems and pair two or more of the systems via at least one user interface (UI). The cluster manager of a given source system (which operates in connection with a data plan of the given system) will automatically exchange configurations required for pairing two or more systems with the cluster manager of the selected target system(s).

As detailed herein, one or more embodiments include implementing DNS-SD techniques. In such an embodiment, at least one DNS can be configured to host records of various types (e.g., canonical name (CNAME), mail exchange (MX), pointer (PTR), service record (SRV), etc.) for a particular domain. A DNS server contains zone files, and if a DNS server is authoritative over a zone file, then the DNS server has full control over the zone file for read, write and delete operations. Accordingly, any changes to the zone file will be replicated to all other DNS servers.

FIG. 2 shows an example zone file 200 in an illustrative embodiment. In at least one embodiment, a DNS-SD protocol leverages at least one DNS database to add SRV and text (TXT) records for a PTR record of the domain name to advertise services offered at the domain, as shown in the example zone file 200 in FIG. 2.

As noted herein, one or more embodiments include automatically discovering connected systems within at least one network. In an example embodiment, the cluster manager of each system, upon startup, adds and/or updates at least one SRV record into a data center-managed DNS server to advertise its service-qualified domain name. This step can alternatively be performed, for example, by a system administrator if the cluster manager does not have write access to the DNS server. If a user is concerned, for example, about the sensitivity of one or more SRV records, the user does not need to propagate to public DNS servers, but data center DNS servers can be configured to be visible to enterprise-level connected private networks only.

Figure 3:
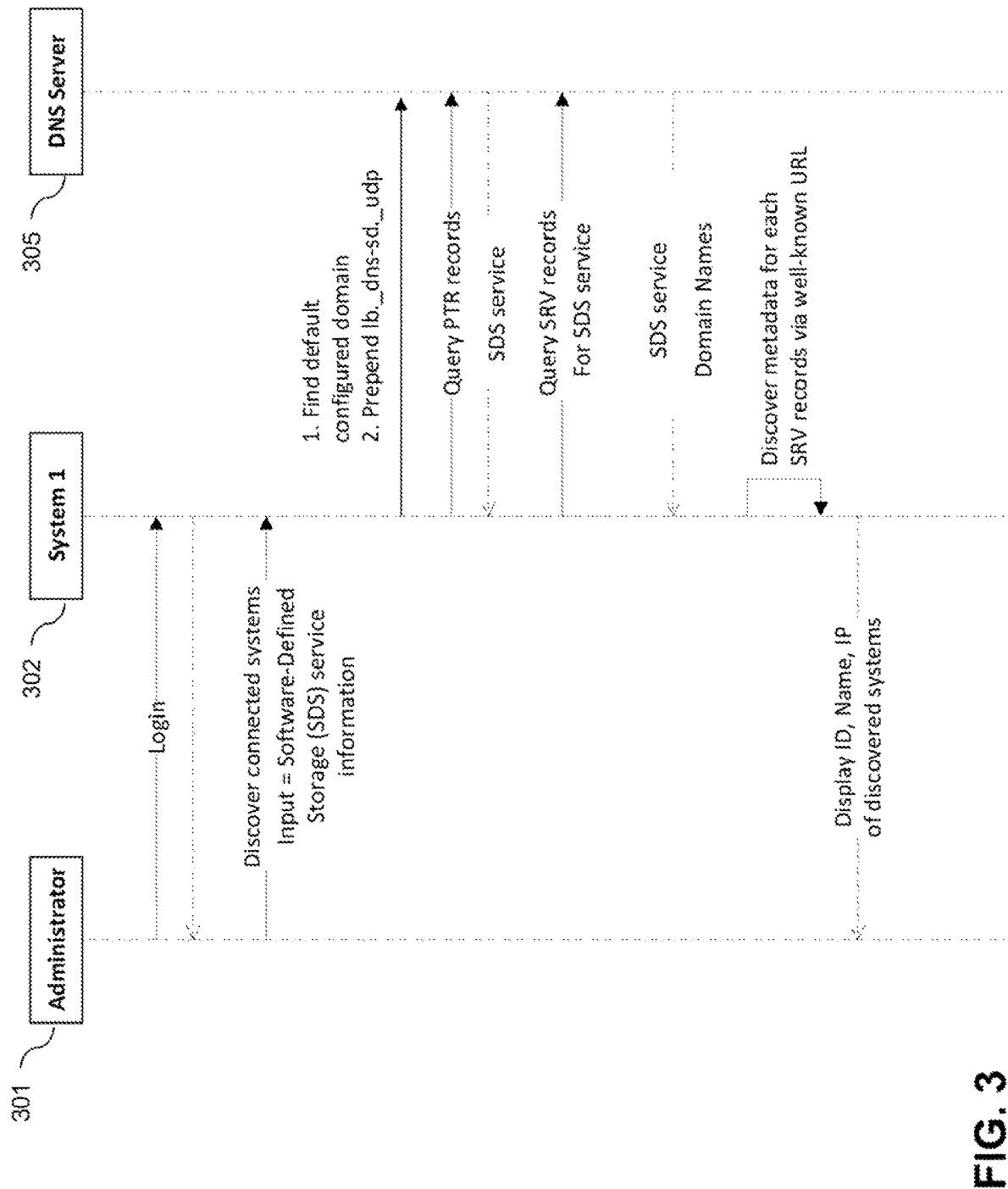
FIG. 3 shows an example flow chart depicting system discovery using DNS-SD techniques in an illustrative embodiment.

FIG. 3 shows an example flow chart depicting system discovery using DNS-SD techniques in an illustrative embodiment. More specifically, as depicted in FIG. 3, system administrator 301 of a source system (System1) 302 initiates DNS-SD by logging-in to system 302 (which provides an acknowledgement back to system administrator 301) and providing a discovery input of, in this example, software-defined storage (SDS) service information. In response to this input, system 302 identifies at least one default configured domain, by querying DNS server 305, and prepends information (e.g., lb._dns-sd._udp) to such a domain. System 302 then queries DNS server 305 for PTR records, and DNS server 305 returns to system 302 SDS service information. System 302 then queries DNS server 305 for SRV records, and DNS server 305 returns to system 302 one or more SDS service domain names. System 302 then discovers metadata for each of the SRV records via at least one well-known URL (which can also be referred to herein as a discovery page), and provides to administrator 301 a display identifier (ID), a name, and an IP address of each of the discovered systems.

As further detailed herein, at least one embodiment includes facilitating the cluster manager of each system to host a discovery page (which, as noted above, can also be referred to as a well-known URL) which includes metadata (e.g., identifying information, name information, certificate information, IP address, etc.) which a peer cluster manager can query using at least one hypertext transfer protocol (HTTP) GET request without requiring authentication. Such a discovery page, in such an embodiment, does not contain sensitive information, but the access to the page can nonetheless be configured to be restricted, for example, to data center-to-data center private WANs.

After automatically discovering one or more connected systems using DNS-SD techniques, the source cluster manager, in one or more embodiments, pings the well-known URL (also referred to herein as the discovery page) of each relevant SRV record to detect one or more particular systems or particular types of systems (e.g., systems associated with and/or configured for carrying out certain services). Other services and/or types of systems can be filtered out, and a final list of discovered systems is persisted in a local database and displayed in at least one UI (associated with the source system). Also, by way merely of example, in at least one embodiment, a system administrator can select one or more of the discovered systems to configure replication pairs.

As also detailed herein, one or more embodiments include implementing a handshake technique using an extension of digest access authentication techniques. Such an embodiment includes extending digest access authentication techniques to confirm the identity of a peer system when a discovered peer system is selected (for example, selected by a system administrator to configure the replication pair). In such an embodiment, the cluster manager of each system is configured with one or more items of information (e.g., at the time of installation) including, for example, identifying information such as a serial number, a software unique identifier (SWID), at least one service tag, and a password.

Figure 7:
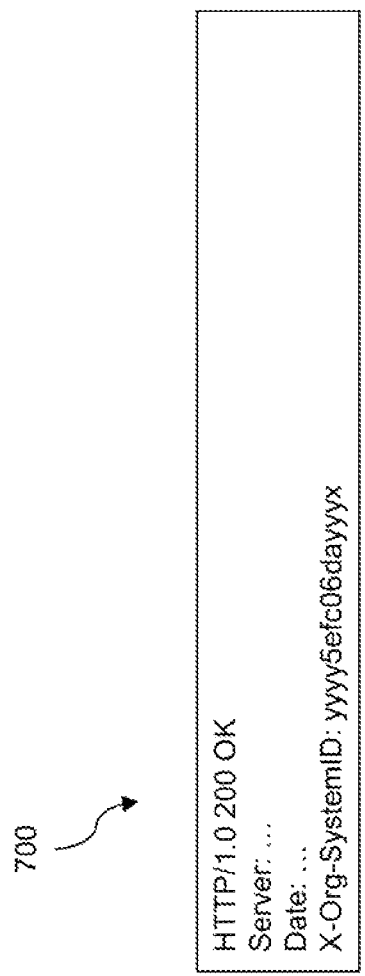
FIG. 7 shows an example target system cluster manager response in an illustrative embodiment.
Figure 8:
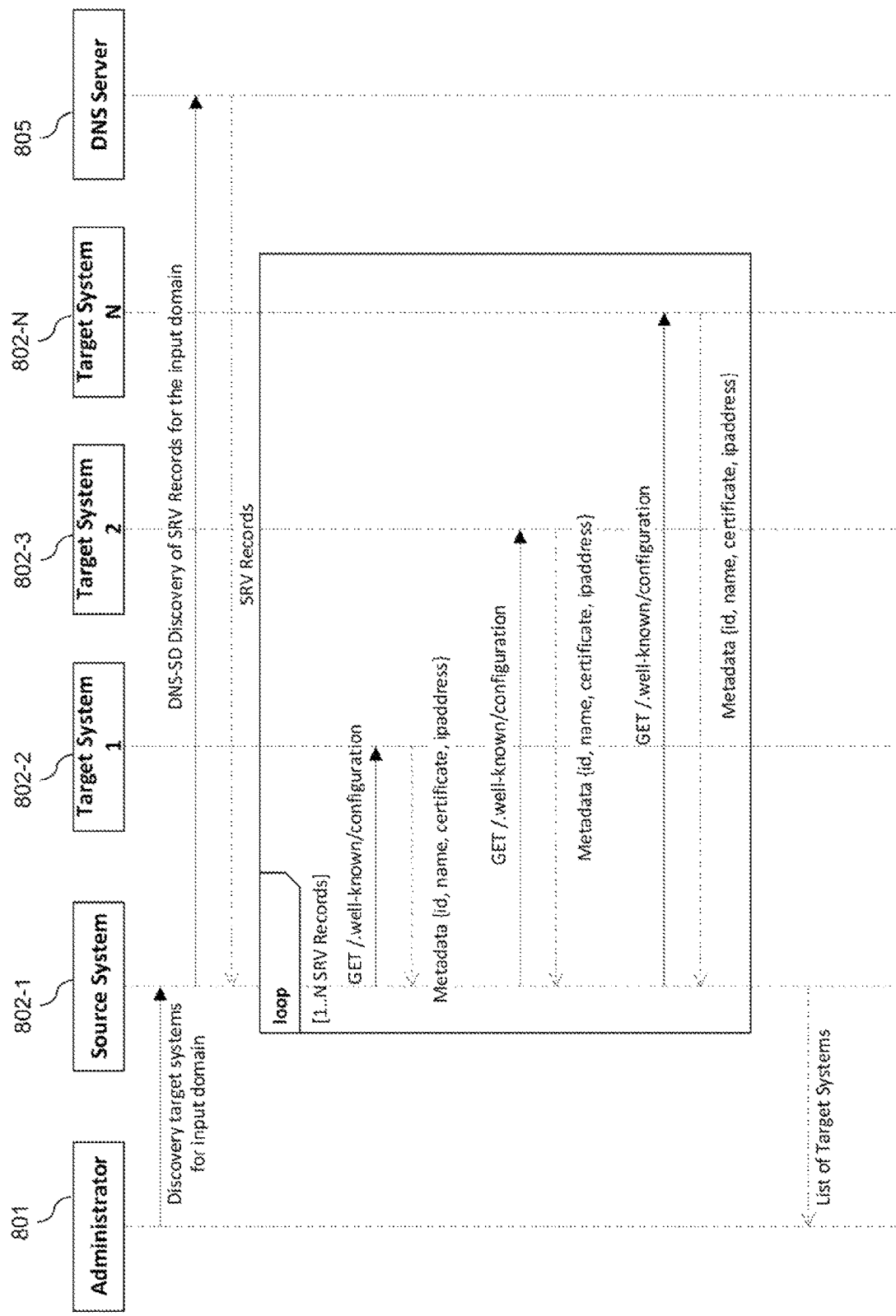
FIG. 8 shows a portion of an example authentication flow in an illustrative embodiment.
Figure 9:
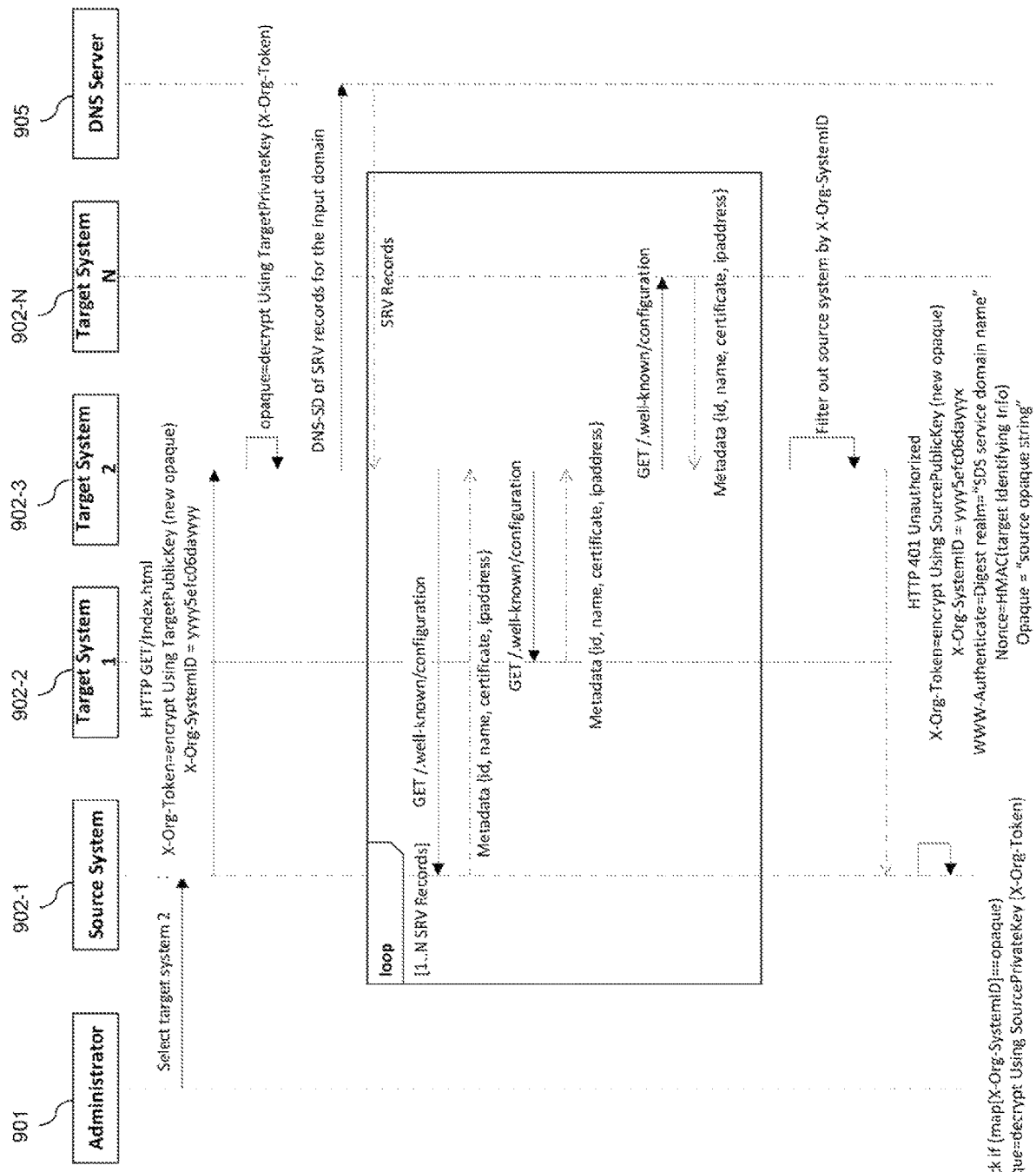
FIG. 9 shows a portion of an example authentication flow in an illustrative embodiment.
Figure 10:
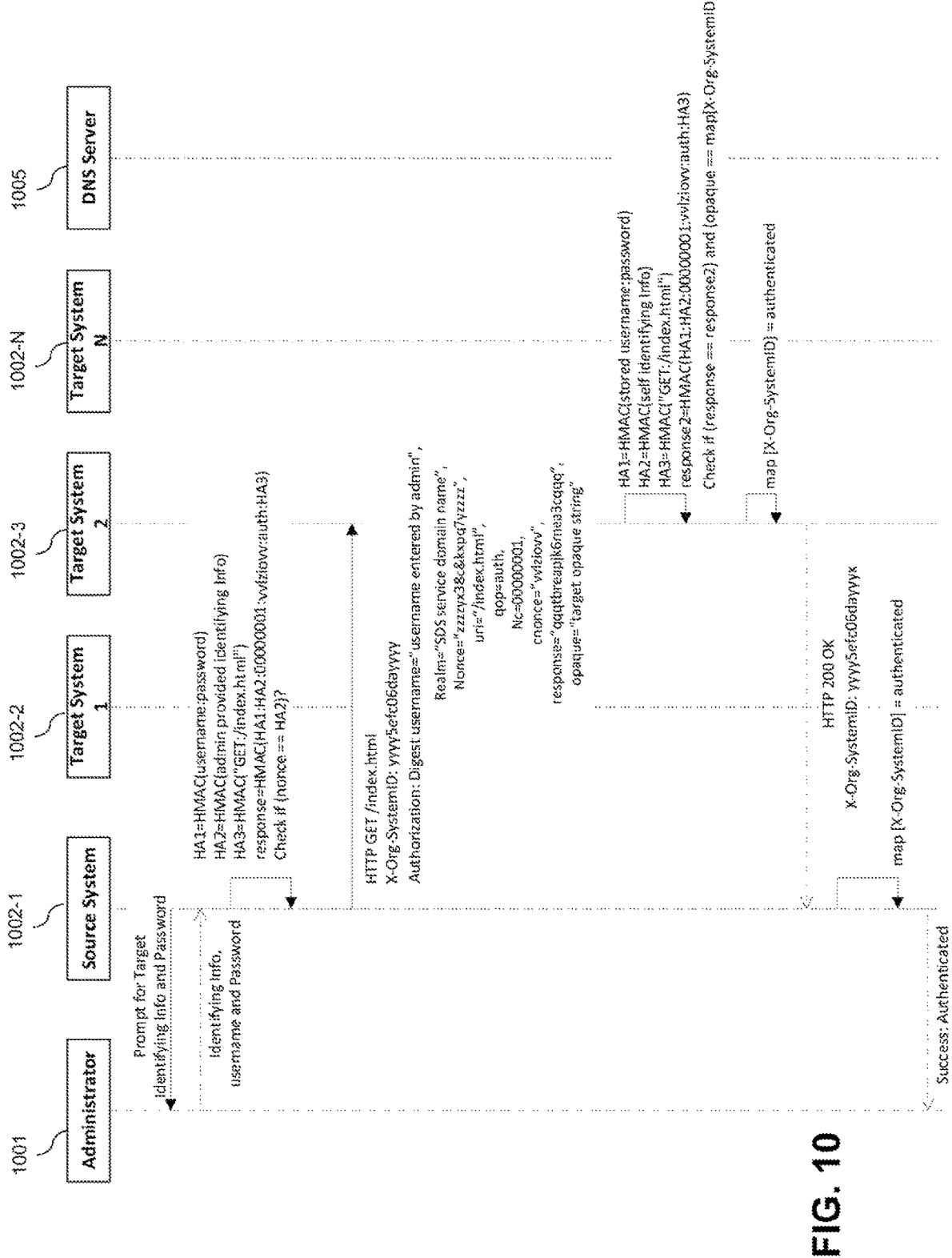
FIG. 10 shows a portion of an example authentication flow in an illustrative embodiment.

By way of illustration, example authentication flows shown in the sequence diagrams depicted in FIGS. 8-10 are carried out over a TLS-encrypted HTTP channel. The same is described below in text format, and depicted in part in FIGS. 4-7.

Figure 4:
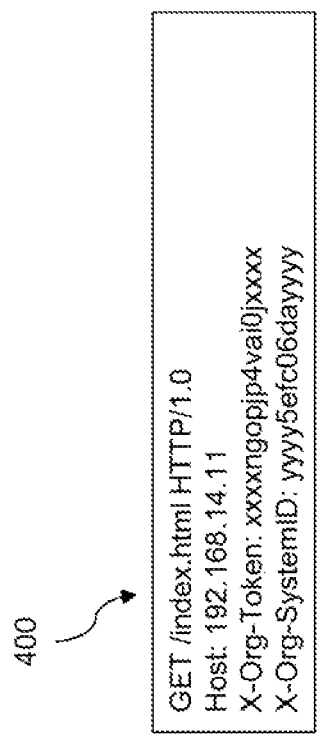
FIG. 4 shows an example cluster manager request in an illustrative embodiment.

FIG. 4 shows an example cluster manager request 400 in an illustrative embodiment. In this embodiment, example code snippet 400 is executed by or under the control of at least one processing system and/or device. For example, the example code snippet 400 may be viewed as comprising a portion of a software implementation of at least part of at least one network-connected system 102 of the FIG. 1 embodiment. Also, it is to be appreciated that this particular example code snippet shows just one example implementation of a cluster manager request, and alternative implementations of the process can be used in other embodiments.

More specifically, in such an example embodiment, a source system cluster manager initiates a request by generating and sending request 400, wherein X-Org-Token=encryptUsingTargetCertificate (new opaque string). Accordingly, the source system initiates a request to the selected target system. The request contains a new token encrypted using the public key (which was obtained from the discovery page) of the target system. The source system is expecting the decrypted value of the token in a subsequent response from the target system, which will confirm that the target system has the private key. At least one target system cluster manager decrypts the X-Org-Token to determine and/or obtain an opaque string (i.e., a new string that may or may not have a structure), and runs DNS-SD techniques to find and/or determine metadata of the source system identified by the X-Org-SystemID header.

Figure 5:
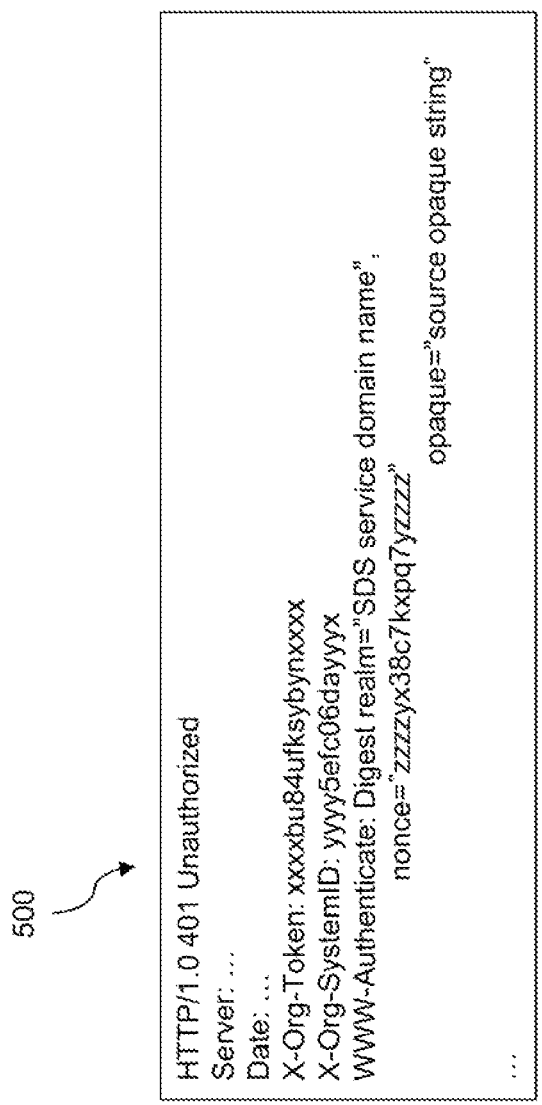
FIG. 5 shows an example unauthorized code in an illustrative embodiment.

FIG. 5 shows an example unauthorized code 500 in an illustrative embodiment. In connection with one or more embodiments, a target system performs DNS-SD to find the public key of the source system via a corresponding discovery page. The target system uses the X-Org-SystemID from a previous request to filter out the rest of the discovered systems. Subsequently, as detailed herein, an HTTP 401 unauthenticated response is generated with at least one decrypted value of a source system token, and a new token is encrypted using the public key of the source system. Similar to the source system, the target system also received the public key from the discovered URL and aims to make sure that the source system has the corresponding private key. The target system, in such an example embodiment, would expect the decrypted value of its token in a subsequent response from the source system.

Referring again to FIG. 5, example code snippet 500 is executed by or under the control of at least one processing system and/or device. For example, the example code snippet 500 may be viewed as comprising a portion of a software implementation of at least part of at least one network-connected system 102 of the FIG. 1 embodiment. Also, it is to be appreciated that this particular example code snippet shows just one example implementation of unauthorized code, and alternative implementations of the process can be used in other embodiments.

More specifically, and to further highlight aspects of one or more embodiments in connection with the above example, upon receiving an HTTP 401 response from the target system, the source system examines the value of the opaque token in the authorization header in an attempt to determine a match with the token sent in the initial request. If the token matches, then the source system confirms that the target system discovered via DNS-SD has the private key. Also, the target system cluster manager responds to the source system cluster manager with an unauthorized code wherein nonce=HMAC (self-identifying information) and X-Org-Token=encryptUsingSourceCertificate (new opaque string). The source system cluster manager then compares the opaque value with the initial value sent to confirm that the peer holds the private key of the certificate discovered in the well-known metadata. The X-Org-SystemID sent by the target system cluster manager helps locate the initial opaque value sent in the source system's session map. Additionally, the source system cluster manager challenges the system administrator to enter identifying information and the password of the target system by presenting realm information, as detailed above. Such a sequence can be akin to a remote login, wherein an administrator clicked on a discovered target system and is subsequently prompted to enter credentials.

The source system cluster manager calculates (using a password, entered by the administrator at the source system, as the key) a hash-based message authentication code (HMAC), which can include identifying information entered by the system administrator, and compares the HMAC with peer nonce to confirm that the target system is known to the system administrator and is not a man-in-the-middle (MITM) or a rogue system advertising its own DNS data.

FIG. 6 shows an example source system cluster manager response 600 in an illustrative embodiment. In this embodiment, example code snippet 600 is executed by or under the control of at least one processing system and/or device. For example, the example code snippet 600 may be viewed as comprising a portion of a software implementation of at least part of at least one network-connected system 102 of the FIG. 1 embodiment. Also, it is to be appreciated that this particular example code snippet shows just one example implementation of a source system cluster manager response, and alternative implementations of the process can be used in other embodiments.

More specifically, and in continuation with the above-detailed authentication flow, the source system cluster manager responds to the target system with the authorization header wherein opaque=decryptUsingSourcePrivateKey (X-Org-Token), which intends to show the target system that the source system has the private key, response=HMAC (HA1:HA2:00000001:vvlziovv:auth:HA3), and HA1=HMAC ("username@SDS.service.domain-name:password"), which intends to confirm that the administrator was challenged for a password (if the target system does not like this response, the target system can respond again with HTTP 401 unauthorized, and the administrator will be prompted to correct the response up to a certain allowed retry limit), HA2=HMAC (identifying information entered by a system administrator), and HA3=HMAC ("GET:/index.html"). Additionally, the target system cluster manager calculates (using the password, pre-configured in the target system, as the key) HA1=HMAC (stored username, password), HA2=HMAC (self-identifying information), HA3=HMAC ("GET:/index.html"), and a response value in the same way as the source system cluster manager, and compares such calculations with a response in the authorization header. A response match implies the match of HA1, HA2 and HA3. The HA1 and HA2 match confirms that the system administrator was authenticated with the correct username, password and target identifying information. The opaque string match confirms that the source system has the private key of the certificate discovered via the well-known URL (also referred to herein as the discovery page). The X-Org-SystemID sent by the source system helps locate the opaque value sent in the target system's session map. Additionally, the HA3 match confirms the uniform resource identifier (URI). One or more other parts of the response match with the quality of protocol (qop), request counter (nc) and client nonce to confirm that the request was not replayed. These matches confirm to the target system that the system administrator is interacting with the source system and the source system is not a MITM or a rogue system advertising its own DNS data.

FIG. 7 shows an example target system cluster manager response 700 in an illustrative embodiment. In this embodiment, example code snippet 700 is executed by or under the control of at least one processing system and/or device. For example, the example code snippet 700 may be viewed as comprising a portion of a software implementation of at least part of at least one network-connected system 102 of the FIG. 1 embodiment. Also, it is to be appreciated that this particular example code snippet shows just one example implementation of a target system cluster manager response, and alternative implementations of the process can be used in other embodiments.

More specifically, and in continuation with the above-detailed authentication flow, the target system cluster manager responds with an OK response for the GET request. At this point, both the source system cluster manager and the target system cluster manager can trust each other for exchanging sensitive information required to pair-up two systems (for example, for replication operations). Depending upon a subsequent use case, the source system and the target system may establish a session tracking ID and a request counter for further communication to maintain the trusted session and avoid a replay attack. Additionally or alternatively, in one or more embodiments, the target system may audit log all activities because the target system is an unattended system. Also, the target system may terminate the session after inactivity of a defined period, and in such a case, the source system must re-authenticate with the target system for further communication.

In accordance with at least one embodiment, one or more modifications to a digest access authentication process can be implemented and used to process cryptographic data (including, for example, tokens, keys, certificates, identifiers, HMAC, nonces, etc.). For example, such an embodiment can include introducing and/or implementing a token (e.g., X-Org-Token) to confirm that both parties (e.g., a source system and a target system) have the private key of their certificates published on their well-known URL. Such an embodiment additionally includes introducing and/or implementing a system identifier (e.g., X-Org-SystemID) to help locate an opaque string from the session map at the source system and the target system, and to help a target system automatically discover the metadata of a source system using DNS-SD techniques and a well-known URL (discovery page). Also, in such an embodiment, the comparison of HMAC (e.g., identifying information entered by a system administrator) with a target system nonce ensures that the target system is known to the administrator and is not a MITM or a rogue system. Further, at least one embodiment includes using an opaque parameter to serve as the decrypted response to an encrypted value sent as header information (e.g., X-Org-Token header). Also, instead of using a preconfigured shared secret across all systems, in one or more embodiments, the source system prompts a system administrator to enter the target system's password.

Additionally, and as noted above, FIGS. 8-10 depict at least one example authentication flow carried out over a TLS-encrypted HTTP channel.

Accordingly, FIG. 8 through FIG. 10 show portions of an example authentication flow, involving administrator 801/901/1001, source system 802-1/902-1/1002-1, a first target system 802-2/902-2/1002-2, a second target system 802-3/902-3/1002-3, an $N^{th}$ target system 802-N/902-N/1002-N, and a DNS server 805/905/1005, in an illustrative embodiment. More specifically, the example authentication flow, as shown in FIGS. 8-10 and as noted above, is carried out over a TLS encrypted HTTP channel, and is described further below.

An objective of such an authentication flow is for the source system to obtain the IP address and public key of at least one target system through at least one discovery page, via DNS-SD techniques, which is not fully trusted. The source system has to verify that the information obtained via a given discovery page belongs to the corresponding target system, and in an attempt to do so tries encrypting a message and sending it to the given target system to see if the target system can decrypt the message. If the target system decrypts the message successfully, then the accuracy of the public key is confirmed.

Similarly, the target system, before responding, needs to know the source system. Accordingly, the target system performs a DNS-SD techniques for all connected systems and pings the discovery page of each system to filter out source systems using the system ID received in the initial request. At such a juncture, the target system has the IP address and public key of the source system, but such information has to be verified. As such, in response to the initial request, the target system encrypts a message using the public key of the source system and expects the decrypted message to be returned in the subsequent response. If the subsequent response includes the correct decrypted message, then such a response would confirm that the public key information obtained via the discovery page is accurate.

Such steps confirm that both parties have private keys of the public key published on the discovery page, but such steps do not necessarily eliminate the possibility that one party might be a MITM. Accordingly, in an example embodiment, the target system can provide a challenge (e.g., a 401 challenge) to the source system to authenticate.

To respond to a 401 challenge, the source system prompts an administrator to enter the target system's information and/or credentials. The source system then uses a one-way hash (e.g., HMAC) to convert that information into a code, and sends the code to the target system in response to the 401 challenge. Because the target system already has the noted information, the target system computes a one-way hash (e.g., HMAC) in the same order, which produces the same code. When both the received and computed HMAC codes match at the target system, the target system confirms that the source system is acting on behalf of the administrator of the target system. Additionally, in one or more embodiments, the key used in the HMAC at the source system is a password entered by an administrator, and the key used in the HMAC at the target system is the same password, which is known to the target system.

Figure 11:
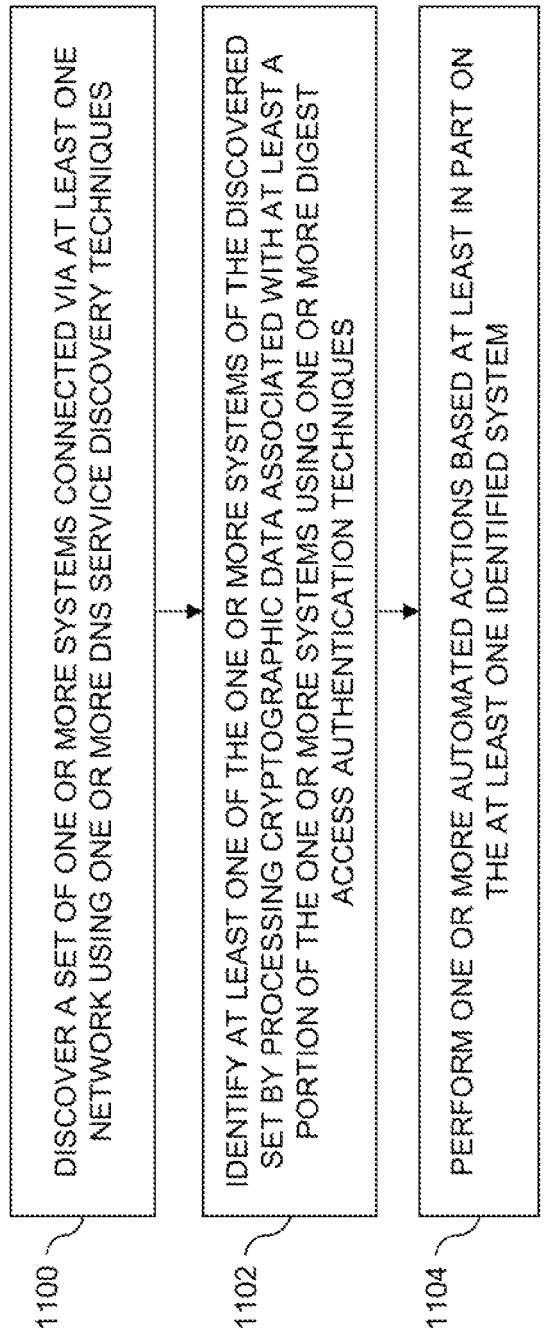
FIG. 11 is a flow diagram of a process for automatically discovering and securely identifying connected systems in an illustrative embodiment.

FIG. 11 is a flow diagram of a process for automatically discovering and securely identifying connected systems in an illustrative embodiment. It is to be understood that this particular process is only an example, and additional or alternative processes can be carried out in other embodiments.

In this embodiment, the process includes steps 1100 through 1104. These steps, in one or more embodiments, can be performed by at least one system 102 utilizing modules 112, 114 and 116.

Step 1100 includes discovering a set of one or more systems connected via at least one network using one or more DNS-SD techniques. In one or more embodiments, using one or more DNS-SD techniques includes configuring at least one DNS to host multiple types of records for a particular domain. Configuring at least one DNS to host multiple types of records can include configuring the at least one DNS to host two or more of canonical name records, mail exchange records, pointer records, service records, and text records for the particular domain. Additionally or alternatively, in at least one embodiment, discovering the set of one or more devices includes discovering all systems connected via the at least one network, and/or discovering the set of one or more systems on at least a basis of one or more identified cluster manager services.

Step 1102 includes identifying at least one of the one or more systems of the discovered set by processing cryptographic data associated with at least a portion of the one or more systems using one or more digest access authentication techniques. In at least one embodiment, the steps depicted in FIG. 11 are performed by at least one source system from the set of one or more systems, wherein the at least one identified system is at least one target system from the set of one or more systems, and wherein using one or more digest access authentication techniques includes confirming that the at least one source system and the at least one target system have at least one private key associated with certificates published on respective uniform resource locators using at least one token. Also, in such an embodiment, using one or more digest access authentication techniques includes locating at least one opaque string from a session map associated with the at least one source system and the at least one target system using at least one system identifier. Further, in such an embodiment, using one or more digest access authentication techniques includes confirming the identity of the at least one target system by comparing hash-based message authentication code at least one nonce associated with the at least one target system.

Step 1104 includes performing one or more automated actions based at least in part on the at least one identified system. In at least one embodiment, performing the one or more automated actions includes establishing a secure communication session with the at least one identified system. Also, in one or more embodiments, performing the one or more automated actions includes outputting, using at least one of one or more uniform resource locators and one or more user interfaces, information pertaining to the at least one identified system. Additionally or alternatively, performing the one or more automated actions can include processing at least one automated response from the at least one identified system confirming an operational status of the at least one identified system.

Accordingly, the particular processing operations and other functionality described in conjunction with the flow diagram of FIG. 11 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically discover and securely identify connected systems. These and other embodiments can effectively overcome problems associated with time-consuming and error-prone processes involving manually entering IP addresses.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 12 and 13. Although described in the context of system 100, these platforms may also be used to implement at least portions of other information processing systems in other embodiments.

Figure 12:
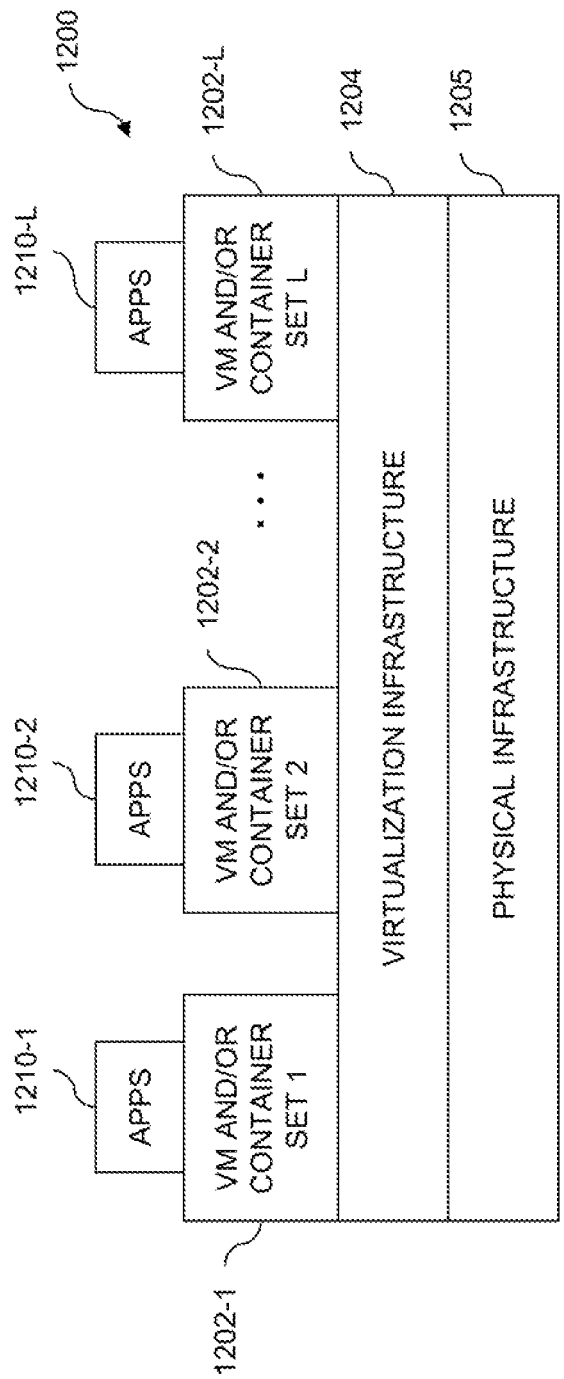
FIGS. 12 and 13 show examples of processing platforms that may be utilized to implement at least a portion of an information processing system in illustrative embodiments.
Figure 13:
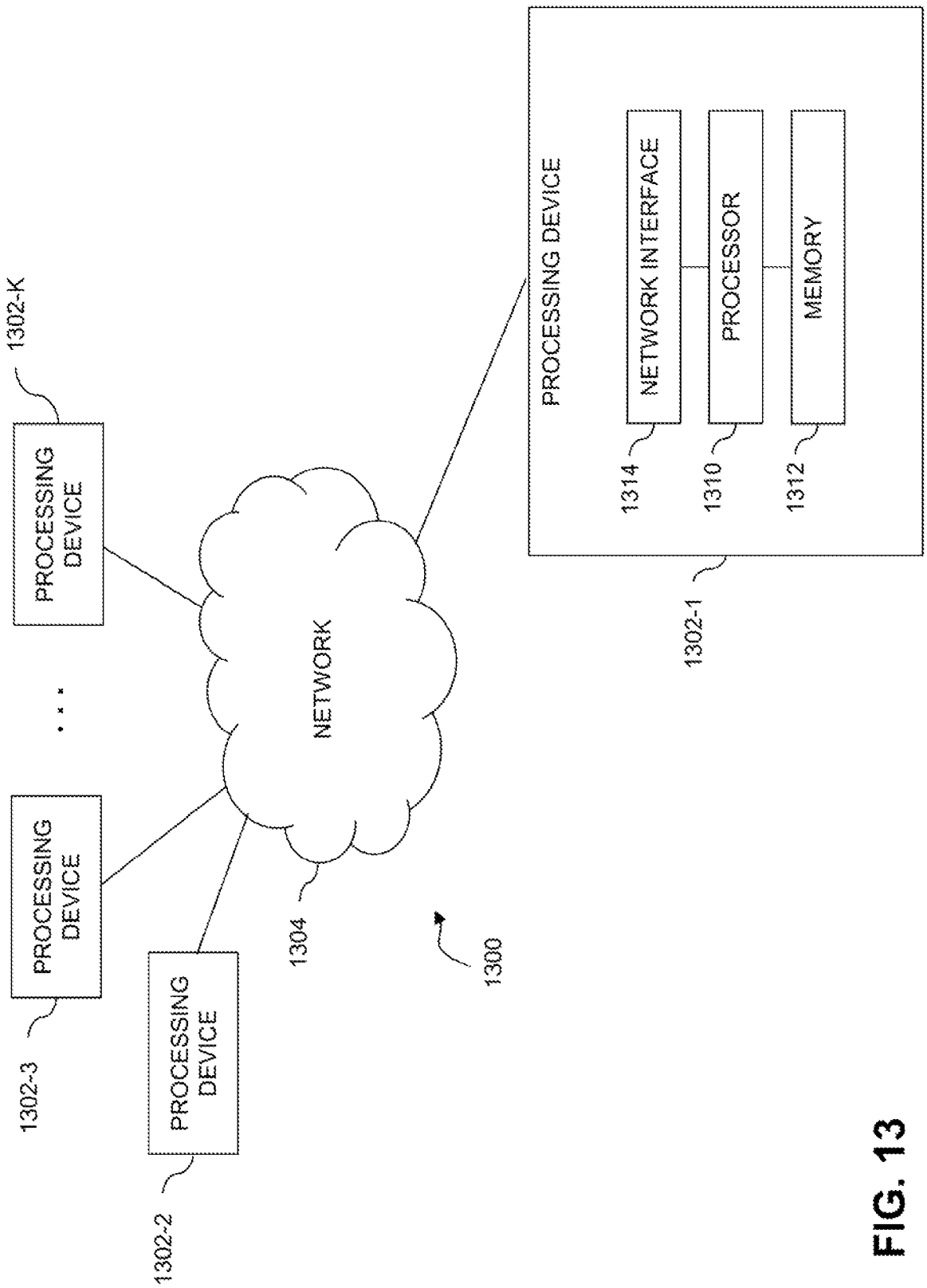

FIG. 12 shows an example processing platform comprising cloud infrastructure 1200. The cloud infrastructure 1200 comprises a combination of physical and virtual processing resources that are utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 comprise respective VMs, respective sets of one or more containers, or respective sets of one or more containers running in VMs. In some implementations of the FIG. 12 embodiment, the VMs/container sets 1202 comprise respective VMs implemented using virtualization infrastructure 1204 that comprises at least one hypervisor.

A hypervisor platform may be used to implement a hypervisor within the virtualization infrastructure 1204, wherein the hypervisor platform has an associated virtual infrastructure management system. The underlying physical machines comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1302-1 in the processing platform 1300 comprises a processor 1310 coupled to a memory 1312.

The processor 1310 comprises a microprocessor, a microcontroller, an application-specific integrated circuit (ASIC), a field-programmable gate array (FPGA) or other type of processing circuitry, as well as portions or combinations of such circuitry elements.

The memory 1312 comprises random access memory (RAM), read-only memory (ROM) or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
discovering a set of one or more systems connected via at least one network using one or more domain name server (DNS) service discovery techniques, wherein discovering the set of one or more systems comprises discovering one or more cluster manager services across the one or more systems connected via at least one of one or more local area network links and one or more wide area network links associated with the at least one network;
identifying at least one of the one or more systems of the discovered set by processing cryptographic data associated with at least a portion of the one or more systems using one or more digest access authentication techniques; and
performing one or more automated actions based at least in part on the at least one identified system;
wherein the method is performed by at least one processing device comprising a processor coupled to a memory.

2. The computer-implemented method of claim 1, wherein performing the one or more automated actions comprises establishing a secure communication session with the at least one identified system.

3. The computer-implemented method of claim 1, wherein the method is performed by at least one source system from the set of one or more systems, wherein the at least one identified system comprises at least one target system from the set of one or more systems, and wherein using one or more digest access authentication techniques comprises confirming that the at least one source system and the at least one target system have at least one private key associated with certificates published on respective uniform resource locators using at least one token.

4. The computer-implemented method of claim 1, wherein the method is performed by at least one source system from the set of one or more systems, wherein the at least one identified system comprises at least one target system from the set of one or more systems, and wherein using one or more digest access authentication techniques comprises locating at least one opaque string from a session map associated with the at least one source system and the at least one target system using at least one system identifier.

5. The computer-implemented method of claim 1, wherein the method is performed by at least one source system from the set of one or more systems, wherein the at least one identified system comprises at least one target system from the set of one or more systems, and wherein using one or more digest access authentication techniques comprises confirming the identity of the at least one target system by comparing hash-based message authentication code and at least one nonce associated with the at least one target system.

6. The computer-implemented method of claim 1, wherein using one or more DNS service discovery techniques comprises configuring at least one DNS to host multiple types of records for a particular domain.

7. The computer-implemented method of claim 6, wherein configuring at least one DNS to host multiple types of records comprises configuring the at least one DNS to host two or more of canonical name records, mail exchange records, pointer records, service records, and text records for the particular domain.

8. The computer-implemented method of claim 1, wherein discovering the set of one or more devices comprises discovering all systems connected via the at least one network.

9. The computer-implemented method of claim 1, wherein performing the one or more automated actions comprises outputting, using at least one of one or more uniform resource locators and one or more user interfaces, information pertaining to the at least one identified system.

10. The computer-implemented method of claim 1, wherein performing the one or more automated actions comprises processing at least one automated response from the at least one identified system confirming an operational status of the at least one identified system.

11. A non-transitory processor-readable storage medium having stored therein program code of one or more software programs, wherein the program code when executed by at least one processing device causes the at least one processing device:
to discover a set of one or more systems connected via at least one network using one or more DNS service discovery techniques, wherein discovering the set of one or more systems comprises discovering one or more cluster manager services across the one or more systems connected via at least one of one or more local area network links and one or more wide area network links associated with the at least one network;
to identify at least one of the one or more systems of the discovered set by processing cryptographic data associated with at least a portion of the one or more systems using one or more digest access authentication techniques; and to perform one or more automated actions based at least in part on the at least one identified system.

12. The non-transitory processor-readable storage medium of claim 11, wherein performing the one or more automated actions comprises establishing a secure communication session with the at least one identified system.

13. The non-transitory processor-readable storage medium of claim 11, wherein the program code is executed by at least one source system from the set of one or more systems, wherein the at least one identified system comprises at least one target system from the set of one or more systems, and wherein using one or more digest access authentication techniques comprises confirming that the at least one source system and the at least one target system have at least one private key associated with certificates published on respective uniform resource locators using at least one token.

14. The non-transitory processor-readable storage medium of claim 11, wherein the program code is executed by at least one source system from the set of one or more systems, wherein the at least one identified system comprises at least one target system from the set of one or more systems, and wherein using one or more digest access authentication techniques comprises locating at least one opaque string from a session map associated with the at least one source system and the at least one target system using at least one system identifier.

15. The non-transitory processor-readable storage medium of claim 11, wherein the program code is executed by at least one source system from the set of one or more systems, wherein the at least one identified system comprises at least one target system from the set of one or more systems, and wherein using one or more digest access authentication techniques comprises confirming the identity of the at least one target system by comparing hash-based message authentication code and at least one nonce associated with the at least one target system.

16. An apparatus comprising:
at least one processing device comprising a processor coupled to a memory;
the at least one processing device being configured:
to discover a set of one or more systems connected via at least one network using one or more DNS service discovery techniques, wherein discovering the set of one or more systems comprises discovering one or more cluster manager services across the one or more systems connected via at least one of one or more local area network links and one or more wide area network links associated with the at least one network;
to identify at least one of the one or more systems of the discovered set by processing cryptographic data associated with at least a portion of the one or more systems using one or more digest access authentication techniques; and
to perform one or more automated actions based at least in part on the at least one identified system.

17. The apparatus of claim 16, wherein the at least one processing device comprises at least one source system from the set of one or more systems, wherein the at least one identified system comprises at least one target system from the set of one or more systems, and wherein using one or more digest access authentication techniques comprises confirming that the at least one source system and the at least one target system have at least one private key associated with certificates published on respective uniform resource locators using at least one token.

18. The apparatus of claim 16, wherein the at least one processing device comprises at least one source system from the set of one or more systems, wherein the at least one identified system comprises at least one target system from the set of one or more systems, and wherein using one or more digest access authentication techniques comprises locating at least one opaque string from a session map associated with the at least one source system and the at least one target system using at least one system identifier.

19. The apparatus of claim 16, wherein the at least one processing device comprises at least one source system from the set of one or more systems, wherein the at least one identified system comprises at least one target system from the set of one or more systems, and wherein using one or more digest access authentication techniques comprises confirming the identity of the at least one target system by comparing hash-based message authentication code and at least one nonce associated with the at least one target system.

20. The apparatus of claim 16, wherein performing the one or more automated actions comprises establishing a secure communication session with the at least one identified system.

* * * * *